United States Patent [19]
Cornell

[11] Patent Number: 5,988,211
[45] Date of Patent: Nov. 23, 1999

[54] I.V. FLOW CONTROLLER

[75] Inventor: William Daniel Cornell, Ballwin, Mo.

[73] Assignees: Randolph W. Cornell, Omaha, Nebr.;
Alice M. Cornell, Cincinnati, Ohio;
part interest to each

[21] Appl. No.: 09/110,164

[22] Filed: Jul. 6, 1998

[51] Int. Cl.[6] .................................................. G05D 7/01
[52] U.S. Cl. .................... 137/504; 137/501; 137/516.25;
137/517; 137/550; 137/556.6
[58] Field of Search ................................. 137/501, 504,
137/517, 521, 516.25, 843, 550, 556.6

[56] References Cited

U.S. PATENT DOCUMENTS

| | | | |
|---|---|---|---|
| 3,288,578 | 11/1966 | Witt | 137/516.25 |
| 3,886,968 | 6/1975 | Murrell | 137/504 |
| 4,241,757 | 12/1980 | Bron | 137/501 |
| 4,245,669 | 1/1981 | Schmidt | 137/501 |

*Primary Examiner*—Stephen M. Hepperle

[57] ABSTRACT

An I.V. Flow Controller incorporating an adjustable, differential pressure regulator that provides a constant but adjustable differential pressure across a fixed orifice. One end of the adjustment range provides shut-off and the other end full-flow. The adjustment range covers flow rates from zero to 250 ml/hr. At a given setting, the flow rate is independent of the total hydrostatic head height between the supply reservoir and a patient, provided the head height is greater than the pressure drop across the orifice at the maximum regulated flow rate, plus venous pressure, plus the pressure drop in the indwelling catheter.

12 Claims, 4 Drawing Sheets

A = INCREASE IN PRESSURE DUE TO INCREASING HEAD HEIGHT
B = PRESSURE DROP THROUGH ORIFICE
C = PRESSURE DROP THROUGH EXIT VALVE
D = PRESSURE DROP THROUGH INDWELLING CANNULA, PLUS THE PRESSURE REQUIRED TO OVERCOME VENOUS PRESSURE

I.V. FLOW CONTROLLER

FIELD OF THE INVENTION

This invention is directed to the goal of providing means for accurate control of the flow of fluid into the vein of a patient; being easily set to a specified flow rate; maintaining the set flow rate over time; being immune to changes in source height or patient height as long as a minimum head height is maintained; and having a cost commensurate with its performance and convenience.

SUMMARY

An I.V. Flow Controller incorporating a differential pressure regulator that provides a constant but adjustable differential pressure across a fixed orifice. One end of the adjustment range provides shut-off and the other end full flow. The adjustment range covers flow rates from zero to 250 ml/hr. At a given setting, the flow rate is independent of hydrostatic head height between the supply reservoir and the patient, as long as the head height is greater than the pressure drop across the orifice at the maximum regulated flow rate, plus venous pressure, plus pressure drop in the indwelling catheter.

BACKGROUND FOR THE INVENTION

With the advent of hypodermic needles and especially stainless steel needle stock, access was provided to the blood system via a vein for performing transfusions, adding plasma, biological saline solution, glucose and drugs to the body. The pressure required to drive the fluid into the vein, overcoming the venous pressure and the pressure drop of the indwelling needle or catheter, is provided by the hydrostatic head produced by raising the supply vessel above the patient. However, for various reasons, the rate of administering the fluid had to be controlled; for instance, when drugs were administered and it was desired to maintain the optimal concentration of drug in the blood system, and when the introduced fluid had a detrimental effect on the vein lining and a slower delivery rate was desired to provide quicker dilution of the drug. These factors gave rise for the need of flow control means From the beginning of I.V. administration to the present time the predominant flow control means was to partially occlude the supply line by clamping means. Of these clamping means the most accepted was the Roller Clamp. However, this means has a common problem caused by the stress induced plastic yielding of the universally used plastic tubing of the administration sets. When the plastic tubing was partially occluded by clamping, the stresses set up in the tubing are slowly released by plastic flow. The result is that the flow rate changes with time, necessitating readjustment of the flow rate one or more times until an stable condition is reached. Nevertheless, Roller Clamps are presently the most used flow control means.

Other I.V. flow rate control means have come to market. One approach has been via an adjustable flow restrictor, wherein the effective length of the flow passage is changed by the adjustment means. Another approach is the use of a differential pressure regulator that provides a constant differential pressure that is applied to a separate, adjustable flow length restrictor. Adjustment of this flow restrictor varies the length of a variable cross-section channel the fluid must traverse. At one end of the adjustment range the channel is occluded for shut-off, at the other end of the adjustment range the channel is bypassed for full flow. This design appears to fulfill a need, but is limited by its manufacturing cost and a propensity to plug.

Both of the above two approaches suffer from the fact that the flow channel must be sealed on both sides for their entire length to prevent leakage externally or along the sides of the channel thereby decreasing the impedance of the flow restrictor. A tight fit of the mating parts to prevent leakage results in too high a torque for acceptable ease of adjustment and conversely, if the adjustment torque is reduced by easing the interference fit, leakage occurs. The worse case occurs if the controller is mounted close to the supply reservoir, in which case the external pressure is greater than the pressure in the flow controller, resulting in air leakage into the I.V. solution. The window between acceptable adjustment torque and the threshold of leakage is small, resulting in difficultly of manufacturing and increased cost.

The present invention uses an internal, fixed orifice providing a hermetically sealed unit, except for the adjusting stem which is sealed by a silicone coated O-ring that provides a vacuum tight seal.

ADVANTAGES OF THIS INVENTION

Figure 1:
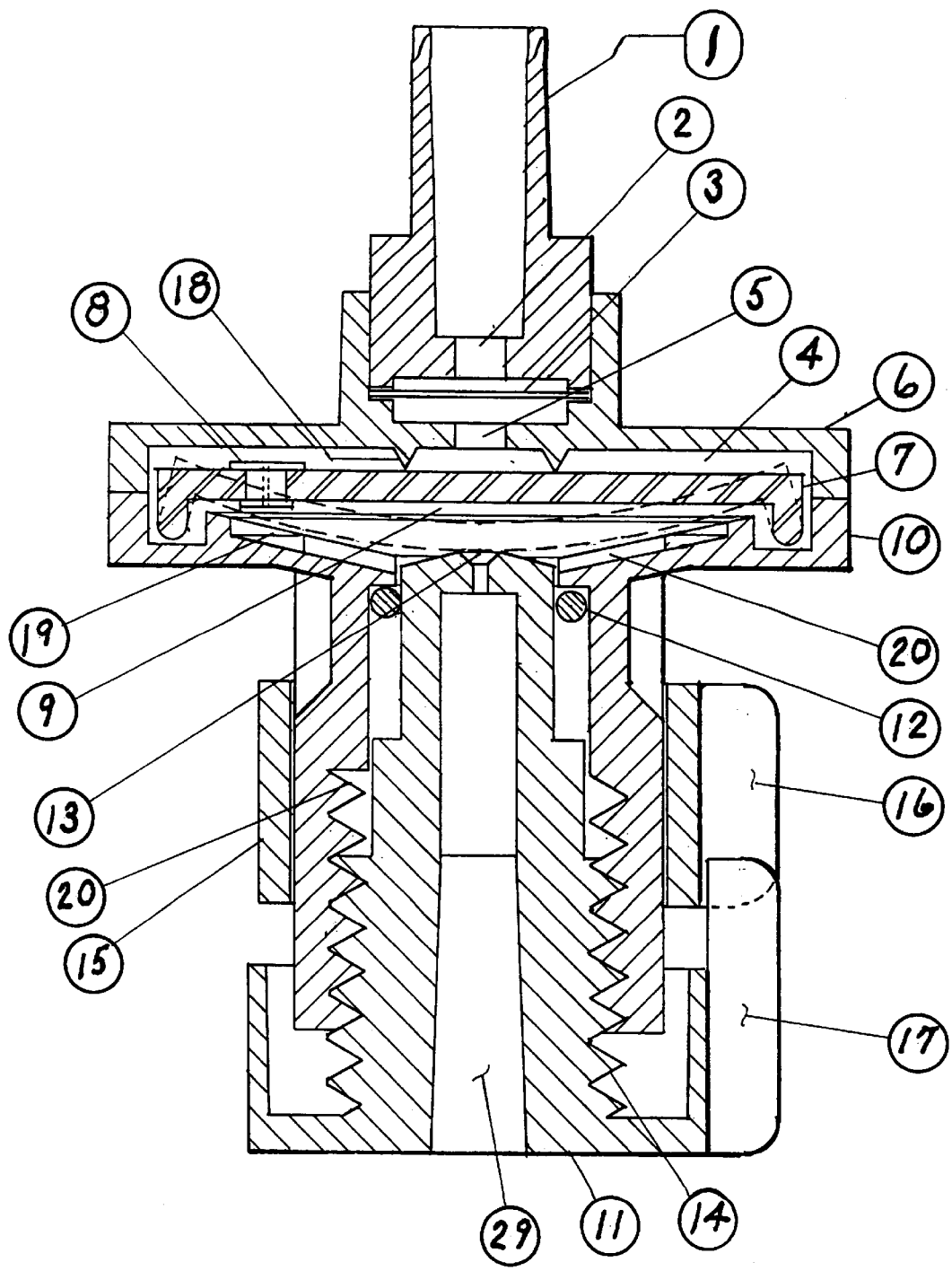
FIG. 1 is a cross-sectional view of the device with the flow restrictor in the diaphragm.

This invention provides calibrated, adjustable flow rate and flow rate immunity to changes in height of the supply vessel and/or the patient level, venous pressure changes and changes in flow resistance of the indwelling needle as long as the hydrostatic head from the supply vessel to the patient is greater than the controlled differential pressure generated by the regulator, plus the venous pressure, plus the pressure drop in the indwelling needle. .

The present invention provides a no-flow position, a regulated flow rate from zero to 250 ml/hr adjustment range and an unregulated full flow position, typically 1000 ml/hr.

The flow control is provided by an adjustable differential pressure applied to a fixed orifice incorporated into the diaphragm of the differential pressure regulator, or to an external orifice. To insure the orifice remains unobstructed, a filter is incorporated into the entrance of the flow controller; this filter having passages significantly smaller than the opening of the orifice.

The re-producability of flow rate versus adjustment position, unit to unit, is controlled by the uniformity of the dimensions of the injection molded structural parts, the uniformity of the orifices, the dimensional uniformity of the diaphragm and the uniformity of the physical properties of the material in the diaphragm; including hardness, resistance to permanent set, hysteresis and friction as the diaphragm flexes.

The present design provides for a compact unit, compared to existing units of comparable performance, and has a lower manufacturing cost.

DESIGN FEATURES

Diaphragm: Past practice has been to clamp the periphery of the diaphragm, or to mold a flange at the periphery of the diaphragm that seats into a conforming recess, or to stamp out the diaphragm from sheet stock and let the periphery rest on a sloping surface. In the first two cases the periphery of the diaphragm is fixed and flexure of the diaphragm is accommodated by tensile stretching of the diaphragm material. Clamping the periphery of the diaphragm causes some of the elastomer in the clamping zone to be elastically displaced radially. This radial displacement causes the diaphragm to change from a neutral condition to a compressed or slack condition. It is very difficult to control the amount of clamping from unit to unit. Seating a flange at the periphery of the diaphragm into a groove of the housing is preferable to clamping, but is very sensitive to dimensional variations, both of the diaphragm and the housing. In the third practice a wafer shaped disc is set onto a concave spherical surface. Deflection is accommodated by a combination of shear and bending strains. The periphery, being radially unrestrained, moves inward as the diaphragm deflects. This movement generates frictional forces that generate radial tensile stresses in the diaphragm as the diaphragm defects. This would be acceptable excepting when the periphery of the diaphragm slips at its outer edge, which, experience proves, does occur. This changes the effective stiffness of the diaphragm and the differential pressure generated.

In the present design, the diaphragm incorporates a flange at its periphery which extends at 90 degrees from one side of the diaphragm. This flange functions to support the diaphragm from a flat, circular surface of the housing. This is the only contact between the diaphragm and the housing. The diaphragm remains in its as molded, neutral condition. As differential pressure deflects the diaphragm and the periphery moves radially inward, this displacement is accommodated by elastic deflection of the supporting flange. The result is that the diaphragm does not exhibit hysteresis due to sliding friction.

In an alternate design, the semi-circular contour at the seating end of said peripheral flange is replaced by a flat surface. The diaphragm is then bonded at this surface to the flat, circular surface of the housing.

Orifice: The orifice is made of an easily machined material, such as 302 stainless steel or alloyed aluminum, subsequently anodized to assure non-reactivity. It has a flange at the top, a stem portion having a length slightly longer than the thickness of the diaphragm and at the bottom a raised retention ridge. The orifice opening is made by drilling through the central axis of the orifice part. The orifice is inserted into a sheared or molded hole in the diaphragm, with the top flange on the high pressure side of the diaphragm and the ridge at the other end on the low pressure side of the diaphragm. The flange and ridge retain the orifice in position during handling, normal flows, fulfill flow and back-flow conditions. The orifice part could be molded of thermoplastic material; such units are commercially available but machined orifices are lower cost.

The concept of placing the orifice in the diaphragm as a separate part or molded as a part of the diaphragm, greatly simplifies the total device as opposed to plumbing the fluid flow from the high pressure side of the diaphragm, thence through an external orifice and returning the fluid to the lower pressure side of the diaphragm. Placing the orifice in the diaphragm produces no detectable detrimental effect on the performance of the diaphragm due to any cause such as unsymmetricalness or the fact that a slight interference fit exists between the orifice stem and the hole in the diaphragm.

Full Flow: The degree of deflection of the diaphragm determines the differential pressure across the diaphragm and the diaphragm deflection is controlled by the position of the outlet opening. It follows that when the outlet opening is withdrawn beyond the permitted range of diaphragm deflection and the diaphragm comes to rest on the housing, then the exit valve is effectively removed from the system and the full hydrostatic head between the supply vessel and the patient is applied across the orifice. (Refer to FIG. 6) This is the condition when the stem is adjusted to the full flow setting. Normally, the adjustment range is zero to 250 ml/hr. At 250 ml/hr the diaphragm generates approximately six inches of water pressure drop. When the diaphragm is held off the exit opening the pressure drop across the orifice increases, typically to thirty six inches of water head.

No Flow: When the stem is adjusted to the off position, the stem pushes the diaphragm against the no-back-flow valve seat, shutting off further fluid flow.

Back Flow: In the event that the supply reservoir is lowered below the flow controller or the patient is above the controller, the I.V. solution will try to flow from the patient to the supply reservoir. This is prevented by the diaphragm being forced up against the no-back-flow valve seat.

Adjustment Calibration: The differential pressure versus diaphragm deflection is not a first order relationship; it is at least a second order. As a consequence, a given small displacement of the adjustment stem at the higher flow end of the range could be expected to produce a greater flow rate change than at the low flow rate end of the adjustment range. This is true of the differential pressure generated across the diaphragm, but since the flow rate through an orifice is proportional to the square root of the applied differential pressure, the result is a near proportionality between the stem adjustment position and the flow rate.

Effect of Head Height on Flow Rate: The only effect of changes in hydrostatic head height between the supply reservoir and patient on flow rate is that generated by the area of the outlet opening. All of the area of the diaphragm is subjected to the controlled differential pressure except that portion directly over the outlet area. This area is subjected to a differential pressure equal to the total hydrostatic head, minus venous pressure and minus pressure drop in the indwelling catheter. This tends to close the outlet causing the flow to decrease with increased head height. However, the ratio of the two diaphragm areas is 256 to 1; consequently the effect is less than one percent change in flow rate.

Body Molding: Since, at full flow the outlet opening is withdrawn below the permitted range of diaphragm deflection, then the fulfill hydrostatic head is applied as a differential pressure across the diaphragm and the orifice. The diaphragm must be supported in this condition or it will be over stressed, possibly resulting in some plastic set of the diaphragm material, which in turn, would alter the calibration. Consequently, the body molding is designed to support the diaphragm in this possible over-travel state. Yet fluid coming through the orifice must have a path to reach the outlet opening. For this reason an annular groove is placed in the body molding centered directly under the orifice. Additionally, one or more radial recesses are incorporated providing a fluid path, from the annular recess to the adjusting stem and outlet opening. These recesses are made as narrow in width as feasible to resist the applied hydrostatic pressure without excessive stress in the diaphragm that could cause permanent set; yet wide enough to assure that sufficient free cross-section area remains open for fluid flow. This is one of the reasons for making the orifice part as small in diameter as feasible and for holding the length of the orifice part extending below the diaphragm to a minimum.

DETAILED DESCRIPTION OF THE INVENTION

Referring to FIG. 1. An inlet connector(1) is solvent welded to the supply tube (not shown) and has an inlet passage(2) that leads to a filter(3). The fluid passing through the filter(3) enters a first chamber(4) through passage(5). Chamber(4) is enclosed by top(6), diaphragm(7) and flow restrictor(8). The fluid that flows through flow restrictor(8) enters chamber(9) which is enclosed by diaphragm(7), main body(10) and adjusting stem(11). A fluid tight seal is maintained between main body(10) and stem(11) by sealing means(12).

When a fluid supply is first applied, the pressure in chamber(4) forces diaphragm(7) downward into contact with the outlet opening(13) in adjusting stem(11). Fluid flows from the higher pressure in chamber(4) into the lower pressure in chamber(9) through flow restrictor(8). This causes the pressure in chamber(9) to rise. When the force generated by this pressure acting on the underside area of the diaphragm equals the force generated by the pressure in chamber(4) acting on the upper surface of the diaphragm minus the restoring force of the elastic diaphragm(7) an equilibrium condition exists. If the pressure in chamber(9) increases above the equilibrium value, the diaphragm(7) lifts off of the outlet opening(13) allowing fluid to flow to the outlet connector portion(29) of adjusting stem(11). Visa versa, if the pressure in chamber(9) is less than the equilibrium value, diaphragm(7) descends closing outlet opening (13).

$P_1 \times A = P_2 \times A + F$  $P_1$=pressure in chamber 4

$(P_1 \times A) - (P_2 \times A) = F$  $P_2$=pressure in chamber 9

$P_1 - P_2 = F/A$  A=area of diaphragm

F=restoring force of diaphragm

Therefore, the differential pressure ($P_1-P_2$) across diaphragm(7) is proportional to the restoring force of the diaphragm; hence, as adjusting stem(11) is moved up or down, the deflection of the diaphragm(7) changes and consequently its restoring force (F) is changed causing a change in the differential pressure ($P_1-P_2$). Since this differential pressure is applied across flow restrictor(8), the flow rate changes.

The stem(11) is moved up or down by its integral threads (14) that engage the integral threads(20) of main body(10).

A calibration scale is carried by the calibration ring(15) having an integral adjustment travel stop(16). A protrusion (17) integral with adjusting stem(11) acts as a pointer over traveling the calibration scale(15) and contacts travel stop (16) at the ends of the adjustment range.

When the unit is calibrated, calibration ring(15) is positioned and locked in place with instant adhesive.

For fulfill flow, adjusting stem(11) is lowered below the permitted travel range of diaphragm(7). This uncovers outlet opening(13); differential pressure regulation stops and the total drive head available between the source and the sink is applied to the flow restrictor(8). Under this condition, diaphragm(7) is forced down into contact with the main body(10). To assure a fluid flow path from the flow restrictor (8) to the outlet opening(13), an annular, recessed channel (19) and radial, recessed channels(20) are provided.

For no flow, adjusting stem(11) is raised clamping diaphragm(7) between adjusting stem(11) and valve seat(18) surrounding passage(5).

In the case of back flow, diaphragm(7) is forced up into contact with valve seat(18), thereby preventing back flow.

Figure 2:
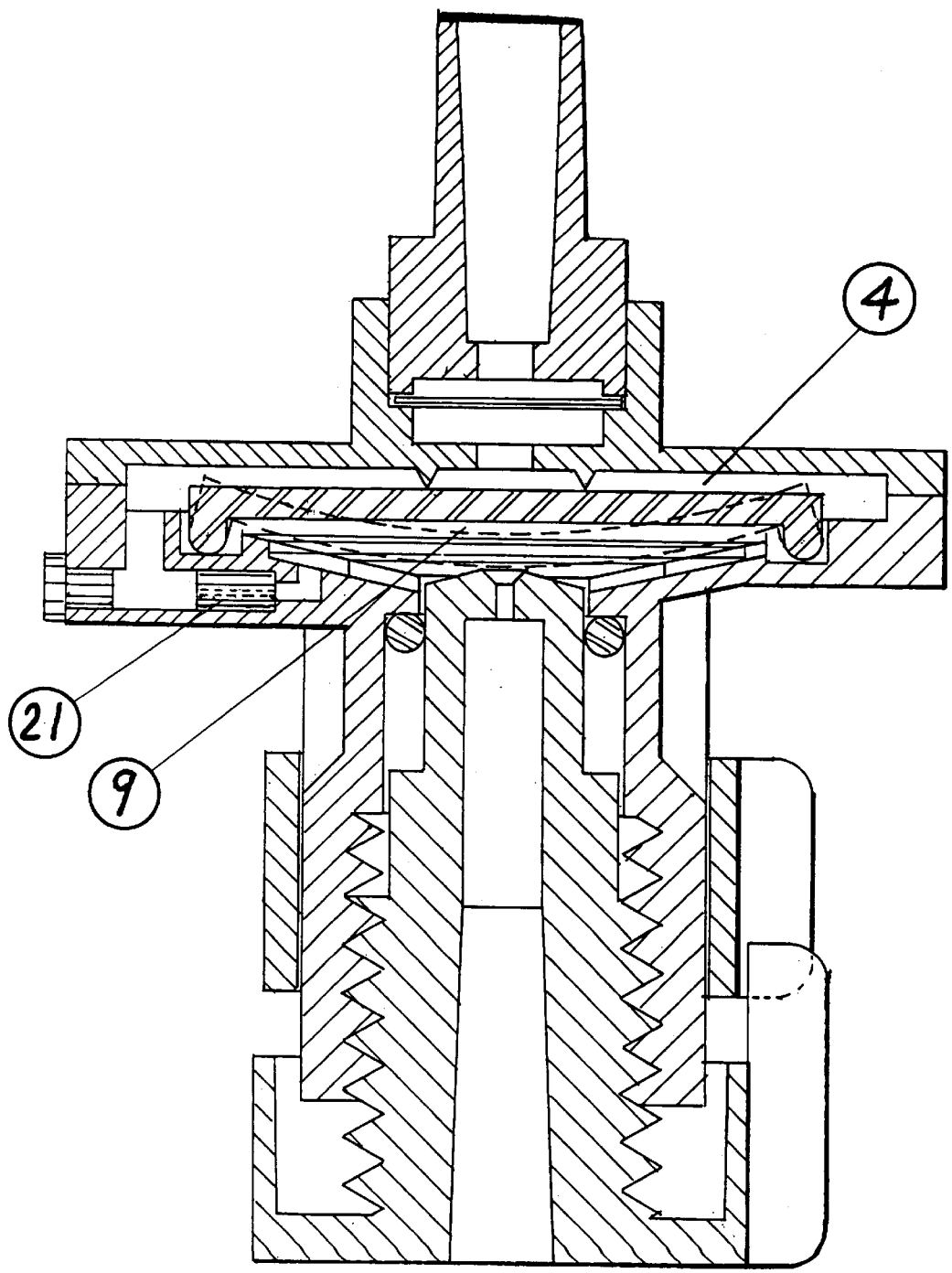
FIG. 2 is a cross-sectional view of the device with the flow restrictor external to the diaphragm.

FIG. 2 is the same as FIG. 1 except flow restrictor(8) and the molded-in hole(24) in the diaphragm(7) into which the flow restrictor(8) is normally mounted is absent. In its place a flow restrictor(21) is sealed in a channel leading from upper chamber(4) to lower chamber(9).

Figure 3:
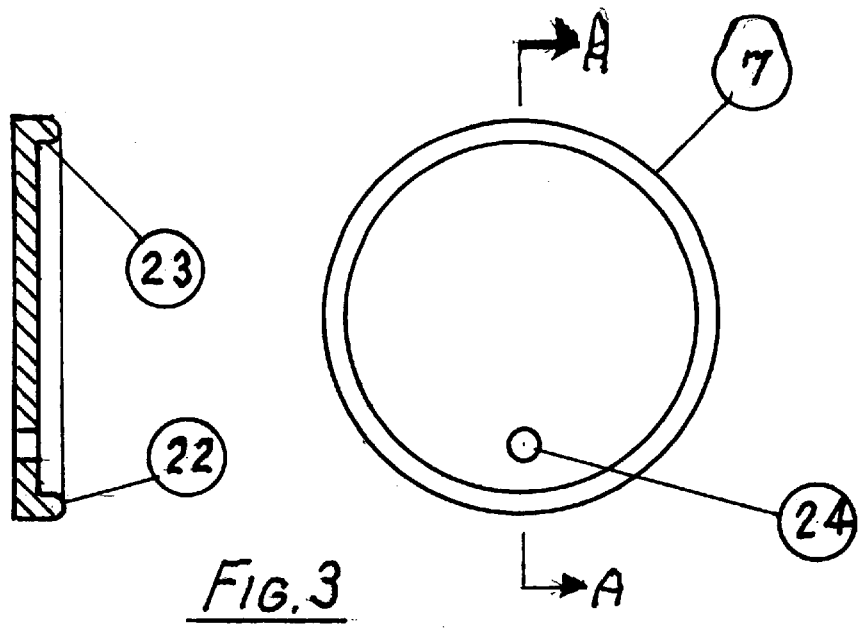
FIG. 3 is a cross-sectional view and a plan view of the diaphragm.

FIG. 3 shows the diaphragm(7) with a molded-in hole(24) into which flow restrictor(8) is press fitted. It also shows the semi-circular end(22) of the circumferential flange(23) that supports the diaphragm. As the diaphragm(7) deflects, the periphery moves radially inward. The rolling action of the curved support plus elastic deformation in the flange accommodates this movement without any hysteresis effects due to friction. Also the diaphragm is merely set into place; therefore, the diaphragm remains in a neutral, unstressed condition.

Figure 4:
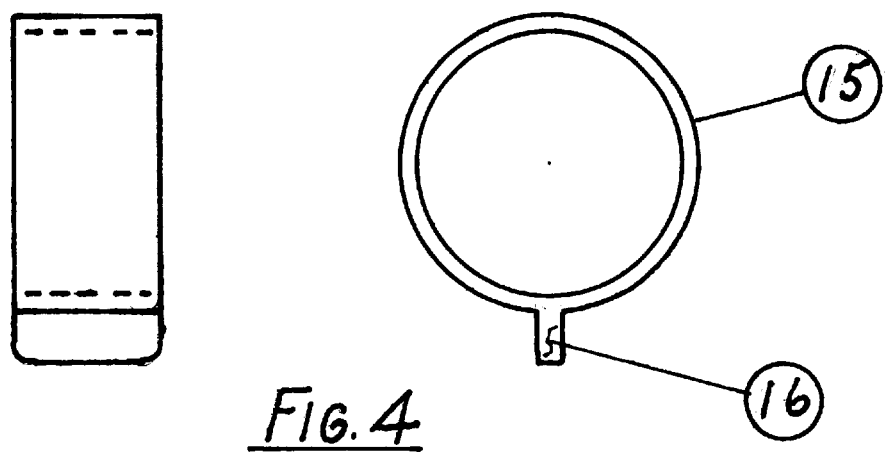
FIG. 4 is a frontal and side view of the combination calibration scale and adjustment stop.

FIG. 4 gives a clearer view of the combination calibration scale(15) and adjustment stop(16).

Figure 5:
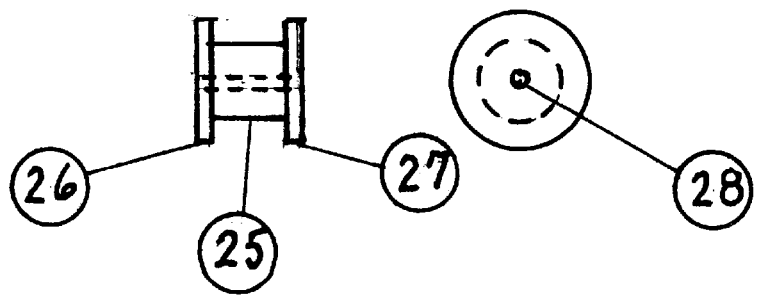
FIG. 5 is a detail drawing of the flow restrictor that is press-fitted into the hole in the diaphragm.

FIG. 5 gives a more detailed view of flow restrictor(8). The cylindrical center section(25) is slightly larger in diameter than the molded-in hole(24) in diaphragm(7). Flange (26) is placed on the higher pressure side of diaphragm(7) and the smaller flange(27) stabilizes the flow restrictor in the diaphragm(7). Central hole(28) functions as the flow restrictor.

Figure 6:
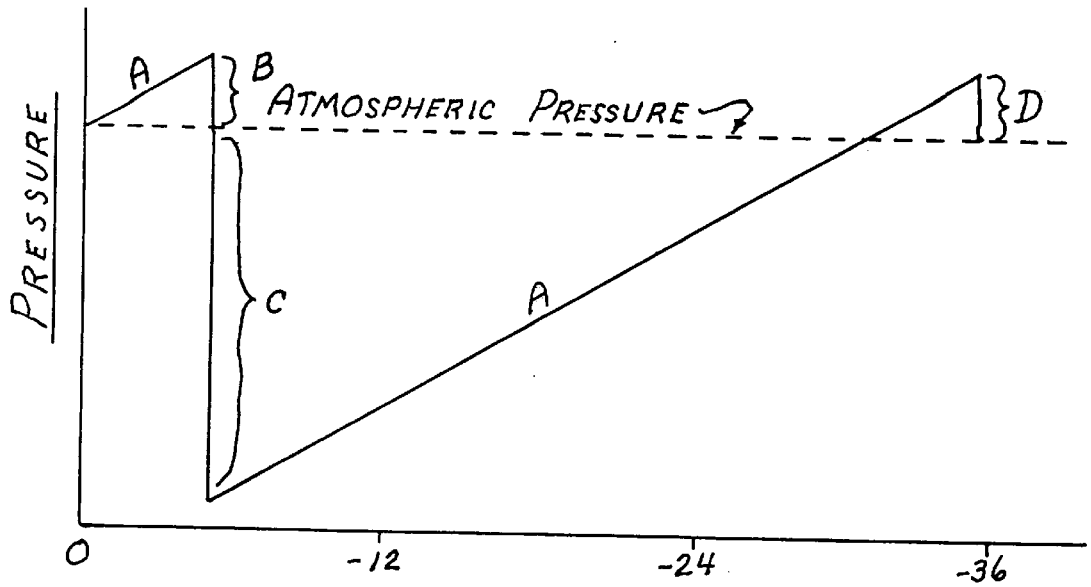
FIG. 6 is a plot of pressure in the I.V. line versus distance below the liquid level in the supply reservoir.

FIG. 6 shows the pressure throughout the length of the I.V. infusion set; the build-up of pressure in the unrestricted sections due to hydrostatic head increase and the pressure decreases at the restrictions; namely, the orifice, the exit valve, the indwelling catheter and the venous pressure.

I claim:

1. An I.V. Controller
    consisting of a housing having a top molding, a body molding, an adjusting molding and a diaphragm that seats in said body molding and divides the internal volume of said housing into an upper chamber and a lower chamber, said top molding having an inlet passage that connects to a tube leading from a supply reservoir;
    a filter in said inlet passage and a discharge opening into said upper chamber, said discharge opening surrounded by a raised ring acting as a valve seat that seats against the said diaphragm in the event of back flow, thereby preventing back flow;
    said adjusting molding, thread mounted into said main body molding, has an inlet opening surrounded by a raised said valve seat that acts in conjunction with said diaphragm and communicates with an outlet opening that connects with a tube leading to a patient;
    said adjusting molding is fluid sealed to said main body molding by an O-ring;
    said adjusting molding when turned moves said outlet opening valve seat toward or away from said diaphragm thereby controlling the differential pressure across said diaphragm to that pressure required to bring the said diaphragm into valving action with said outlet valve seat, thereby controlling the differential pressure across a fixed orifice in fluid communication with said upper and lower chambers and consequently the flow rate.

2. An I.V. Flow Controller incorporating an adjustable differential pressure regulator that impresses the differential pressure generated across a fixed orifice to create a fixed but adjustable flow rate, said adjustable differential pressure regulator and said fixed orifice encased in a housing consisting of a top molding, a body molding and an adjustment molding, a diaphragm divides the internal volume of the casing into an upper chamber and a lower chamber, the said top molding has an inlet port connected to an elevated reservoir of I.V. solution, the said adjustment molding is in thread engagement with said body molding and is fluid tight sealed to said body molding and incorporates an exit port with a valve seat surrounding its entrance and connects to a line that conducts the I.V. solution to the patient, an orifice whose entrance communicates with the higher pressure said upper chamber and said orifice's exit communicates with said lower pressure lower chamber, when I.V. solution is first introduced into the said upper chamber the said diaphragm is deflected downward due to the pressure and into contact with said valve seat at the entrance to said exit port, this seals the said exit port, fluid starts flowing through said orifice from said upper chamber into said lower chamber, raising the pressure in said lower chamber, when the pressure increases to the "set" point the said diaphragm lifts sufficiently from said exit port valve seat to maintain the "set" flow rate, if the said adjusting molding is turned such that the said exit port moves toward the said diaphragm, a new lower flow rate "set" point obtains, if the said adjusting molding is turned such that the said exit port valve seat clamps the said diaphragm against the said no-back flow valve seat all flow is stopped, if the said adjusting molding is turned in the opposite direction higher flow rate "set" points are obtained till the the maximum calibrated flow rate is reached, further turning of the said adjustment molding beyond the permitted travel range of the said diaphragm, thereby unseating the said diaphragm from the said exit port creates the condition for "Full Flow", where the total hydrostatic head is applied to the said orifice.

3. An I.V Flow Controller consisting of an upper molded part and a lower molded part that mate and seal an elastomeric diaphragm between them forming a housing having an upper chamber and a lower chamber separated by said diaphragm;

a fixed orifice mounted in said diaphragm;

an inlet into said upper chamber connected by tubing to an elevated container of I.V. solution;

an adjusting molding containing an outlet opening and its associated valve seat, said outlet opening communicating via a central passage to a connector portion that accepts an outlet tube that leads to a patient, said adjusting molding, thread mounted in said lower molding such that the said outlet opening can be moved toward or away from said diaphragm by manually turning said adjusting molding;

this assembly forming an adjustable, differential pressure regulator where the bias force that determines the differential pressure generated, is the restoring force of said elastic diaphragm, said differential pressure is applied to said orifice thereby producing the controlled flow rate, said differential pressure is adjustable by moving said outlet toward or away from said diaphragm;

said upper molding has a raised ridge surrounding said inlet on the said upper chamber's side, functioning as a no back flow valve seat in conjunction with said diaphragm to prevent back flow.

4. An I.V. Flow Controller as per claim 3, wherein said differential pressure regulator includes a said diaphragm that has at its periphery an integral flange extending essentially 90 degrees downward from the plane of the said diaphragm such that as said diaphragm deflects the radial contraction of said diaphragm is accommodated by elastic deformation only and there exists no frictional effects.

5. An I.V. Flow Controller as per claim 3, wherein said diaphragm has a hole in it that functions as an orifice.

6. An I.V. Flow Controller as per claim 3, wherein said outlet opening can be withdrawn from said diaphragm a distance greater than the permitted travel of said diaphragm, thereby keeping said outlet open for full flow and causing the total hydrostatic head available to be impressed across said orifice.

7. An I.V. Flow Controller as per claim 3, wherein said outlet and its associated said valve seat are part of said adjusting molding, said outlet opening communicating via a central passage to a connector portion that accepts an outlet tube that leads to a patient, and external threads that engage said lower molding.

8. An I.V. Flow Controller as per claim 3, wherein said adjusting molding bas a pointer, as an integral part, that over-rides a calibration scale mounted on a collar that in turn is mounted on said lower molding, said collar has a protrusion, as an integral part, that mates with said pointer on said adjustment molding to limit adjustment travel.

9. An I.V. Flow Controller as per claim 3, wherein said adjustment molding can be moved in the direction of said diaphragm to the extent that said diaphragm is clamped between the said no-back flow valve seat and the said outlet valve seat for no flow.

10. An I.V. Flow Controller as per claim 3, wherein said flow controller, as assembled, has said diaphragm in its neutral position with its upper surface just touching said no-back flow valve seat and its said lower surface just touching said outlet of said adjusting molding, said calibration scale is then fixed at zero flow rate for calibration.

11. An I.V. Flow Controller as per claim 3, wherein said adjusting molding provides means for manually adjusting the flow rate.

12. An I.V. flow Controller as per claim 3, having a said calibration scale that indicates the flow rate for each and every setting of the said adjusting molding.

* * * * *